R. M. CHRISTENSEN.
AUTOMATIC COURSE AND DEVIATION FINDER.
APPLICATION FILED OCT. 25, 1918.

1,311,641.

Patented July 29, 1919.
3 SHEETS—SHEET 1.

Inventor
Richard M. Christensen,
Edward E. Clement
Attorney

By

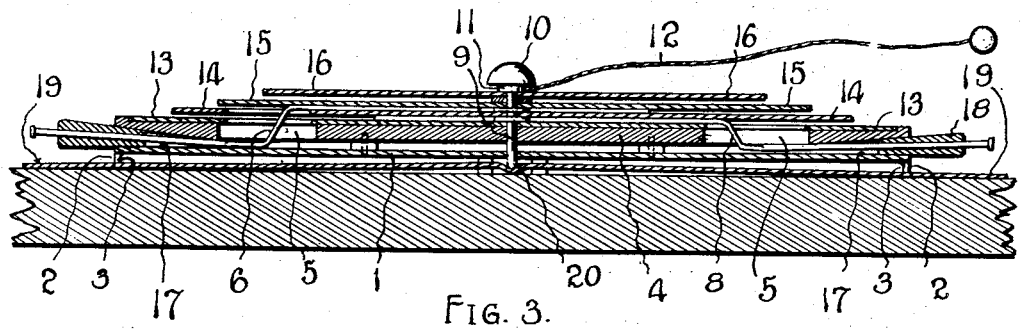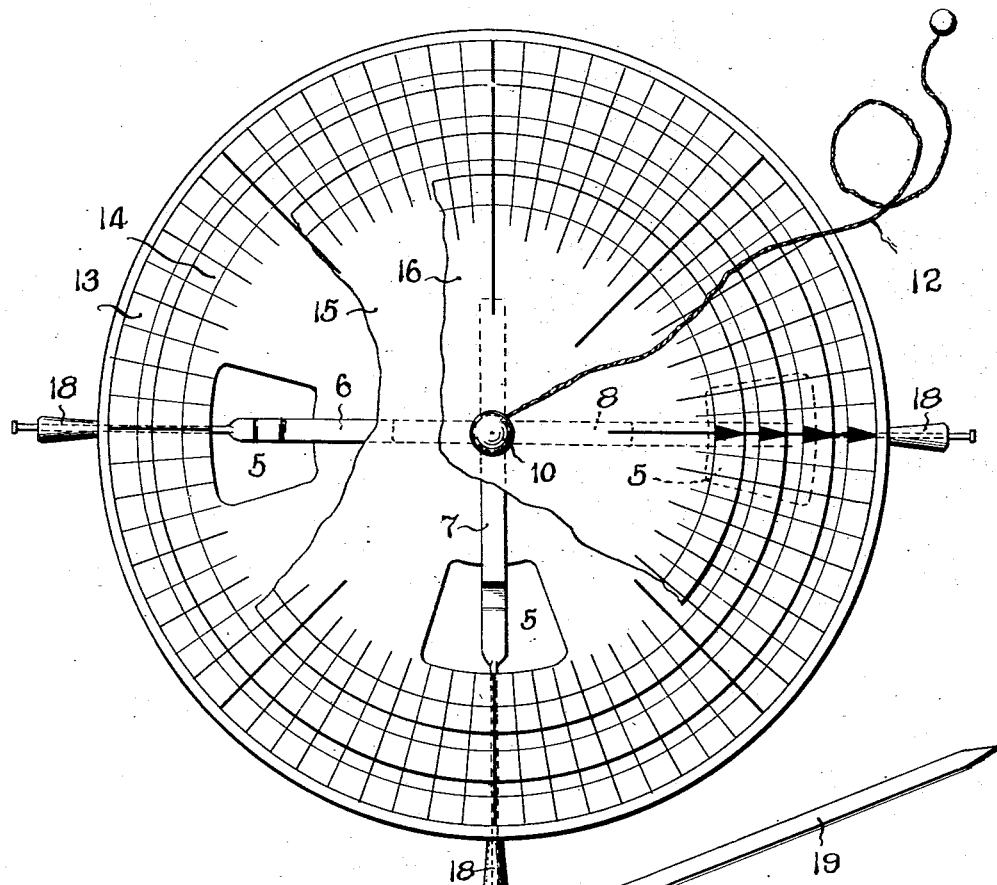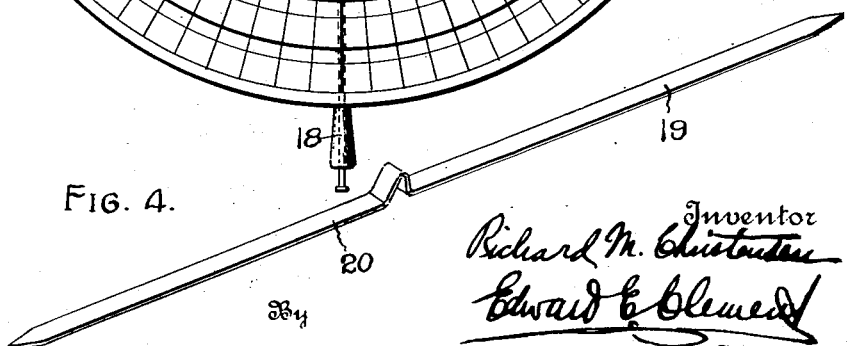

R. M. CHRISTENSEN.
AUTOMATIC COURSE AND DEVIATION FINDER.
APPLICATION FILED OCT. 25, 1918.

1,311,641.

Patented July 29, 1919.
3 SHEETS—SHEET 3.

UNITED STATES PATENT OFFICE.

RICHARD M. CHRISTENSEN, OF NEW YORK, N. Y.

AUTOMATIC COURSE AND DEVIATION FINDER.

1,311,641.  Specification of Letters Patent.  Patented July 29, 1919.

Application filed October 25, 1918. Serial No. 259,735.

*To all whom it may concern:*

Be it known that I, RICHARD M. CHRISTENSEN, a citizen of the United States, residing at New York, in the county of New York and State of New York, have invented certain new and useful Improvements in Automatic Course and Deviation Finders, of which the following is a specification, reference being had therein to the accompanying drawing.

My invention relates to instruments employed in navigation and has for its object the production of mechanical means by the simple manipulation of which correction may be made in laying off a ship's course, for variation, deviation, and differences in the compasses.

My invention is especially intended for use in the chart room of a ship, and it does not include, although it may be applied to, an ordinary working compass. It comprises as its essential features four separately movable, graduated circles or cards, representing respectively the true compass, the magnetic, the standard and the steering compass. These are manually rotated by means of certain levers which will be described hereinafter, and are provided with means for holding them in position when adjusted. I also provide special means for adjusting the device upon a meridian or parallel, for the purpose of measuring or laying off a course.

I am aware that it has heretofore been proposed to provide a plurality of graduated cards concentrically pivoted to make corrections for variation, deviation, etc.; I therefore do not claim the same broadly as my invention; but I shall claim hereinafter the following features: The means for operating and clamping the compass, the means for clamping the cards when set, the means for adjusting and holding the device over a meridian or parallel on a chart, the method described hereinafter for finding with this apparatus the deviation of several compasses, the method for finding the course on the different compasses quickly, and finally the expeditious means which I shall describe for checking up readings and computations to be certain of avoiding mistakes.

My invention is illustrated in the accompanying drawings in which—

Fig. 2 is a diametral section thereof;

Fig. 3 is a plan view without the figures and with parts of the cards broken away to show the entrance and arrangement of the operating levers;

Fig. 4 is a perspective of the metal centering strip for chart work; and

Figure 1:
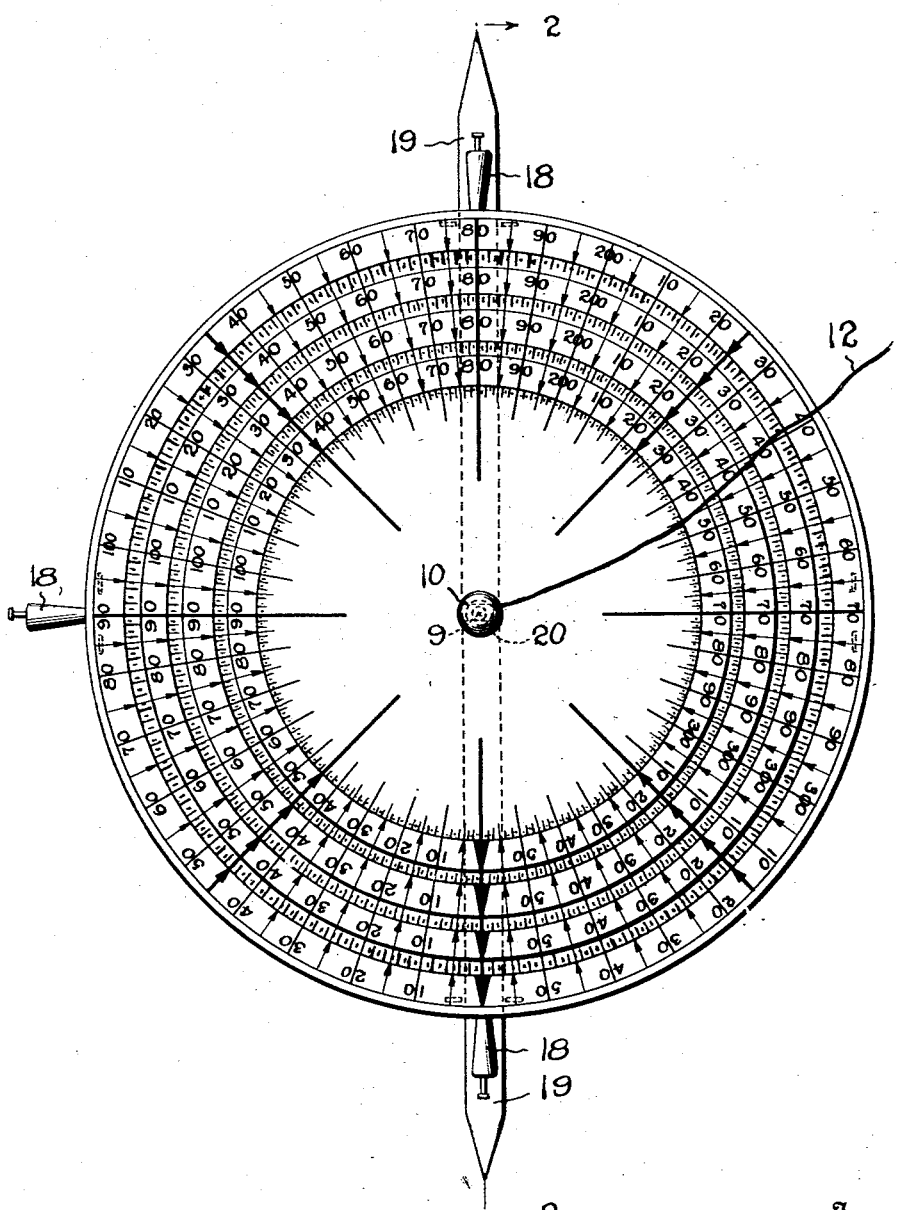
Figure 1 is a plan view of the complete device.

Referring to the drawings, 1 is a base plate which I preferably make of metal, with a down-turned rim 2 which may be either continuous or in four sections, in quadrature with each other. This rim is slotted as shown at 3 in Fig. 2, the slots being in quadrature and coming opposite the cardinal points on the compass and the fixed or true compass card attached to the base. Secured upon this base is a body 4 which may conveniently be of wood, with three openings 5 through it for the passage of the operating levers 6, 7 and 8. This body carries a central pivot 9, the lower end of which is rounded or pointed and projects beneath the base while the upper end is finished with a suitable head 10 overlying the rotating ring or eye 11 to which is attached a direction indicator in the form of a cord or flexible wire 12. As best shown in Figs. 1 and 2 there are four cards, numbered 13, 14, 15 and 16, respectively. Of these, the card 13 being the true compass card is fastened solidly on the body 4. The other cards rotate on the central pivot 9, card 14 being moved by means of the lever 8, 15 by the lever 6, and 16 by the lever 7. The range of movement is of course limited as these cards are only meant to compensate through the well understood range of variation and deviation. Each lever therefore moves in a slot 17 and in order to clamp the lever when set, I provide a cone 18 which slides in and out on the reduced end of the lever and may conveniently be made of cork or some other light, compressible substance.

The cards 13, 14, 15 and 16 in this device are conveniently made of celluloid or similar material, are all provided with the usual graduations in degrees and may also bear the regular compass points if desired. I have shown them with the degree marks only, and with these reading from zero to 360 degrees clockwise, according to U. S. naval practice. The bottom card as stated, represents the true compass, the next card 14 represents the magnetic compass, the next the standard ship's compass and the top card 16 is the steering compass.

For use in chart work with the device thus described, I provide a centering and holding device consisting of a flat strip of steel 19 shown in plan in Fig. 1 in section in Fig. 2 and in perspective in Fig. 4. This strip is bent at its middle to form a sort of notch 20 to receive the lower end of the pivot pin 9 of the instrument in a manner which I shall presently describe.

The method of using my invention is as follows:

To find deviation: (1) I take the variation from the chart and clamp the magnetic card 14 accordingly; (2) then I take the bearing by the standard compass; (3) then I stretch the cord 12 radially and hold it over the true bearing on the card 13, as found in the tables (or per computation of observation) and (4) then bring the bearing as taken by the standard compass, by moving card 15, in the same line under the cord; (5) next I hold the cord over the ship's head at time of observation as per standard compass over card 15; (6) then bring the ship's heading as per steering compass on card 16 in the same line; (7) then holding the cord over zero on the magnetic card 14 will show there the deviation of the different compasses used.

Figure 5:
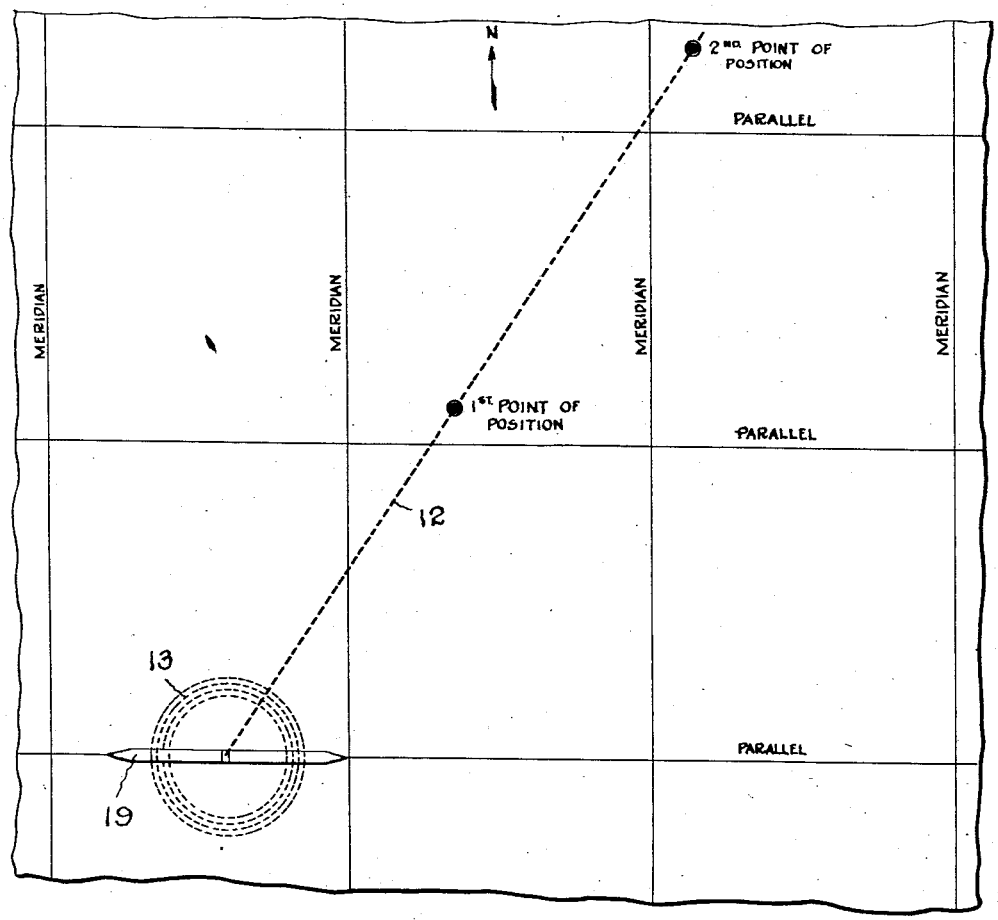
Fig. 5 is a diagram showing the device applied to a parallel, with its center at a point where the parallel is intersected by a prolongation of a line through successive positions of the ship, on a chart.
Figure 6:
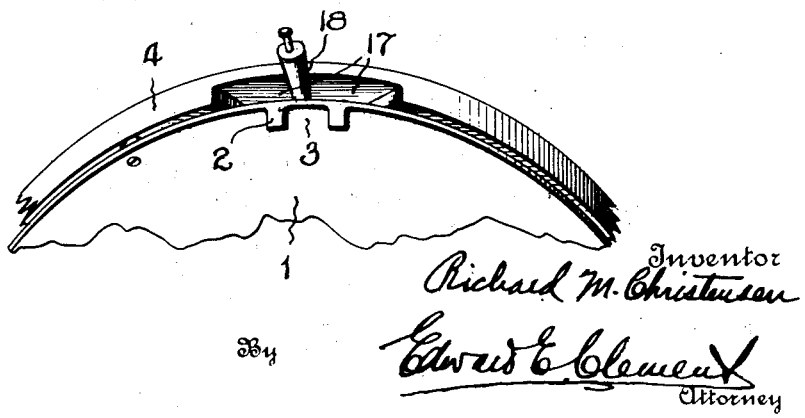
Fig. 6 is a perspective showing the bottom of a portion of the base with one of the guide notches and slots for the levers.

To find the course on chart: (see Fig. 5):

I extend the line of course backward until it crosses a meridian or parallel and there make a mark, then place the shoulder 20 of the metal strip 19 directly over said mark and the ends or points of the spring directly over the meridian or parallel, so that the spring strip will lie along and parallel with the said meridian or parallel. Then I place the apparatus on the strip as shown in Figs. 1, 2 and 5, with the slots 3 of the base flange 2 on the two end parts of the strip 19 which I hold firmly in position by the ends, sliding the compass device along until its pin 9 lands against the shoulder 20, when it will be not only square with the meridian or parallel but will also be centered accurately with respect to the same and also with respect to the course. I then stretch the cord over the first point of position and over the second point of position and read all the courses under the cord on the several cards 13, 14, 15 and 16. At the same time I have a good view of the part of the chart to be traversed, and at a glance can check up my work to insure against mistakes, a point which will be well appreciated by practical navigators. This facility for setting up the device accurately without loss of time, and for having a free view to check up, and yet by means of the extensibility of the cord having immediate, ready and free access to all parts of the chart with accurate readings, I consider valuable features of my invention, and shall claim them accordingly. Furthermore, I am not aware that they have ever been provided in devices having four or a similar number of cards with separate setting and locking devices, such as I describe.

Varous modifications and changes in the foregoing apparatus, especially in points of detail, will readily occur to those skilled in this art, and for this reason I wish it distinctly understood that I contemplate all such non-essential changes and modifications as fall fairly within the scope of the appended claims. Thus, I may use a flexible wire composed of fine braided strands or the like instead of the cord described, or I may substitute a flexible metal or fabric strip for the same, and may graduate said strip in any desired manner. I may also change the form of the locking devices shown as cones; and instead of clamping all the cards when set to the base, I may make a modified form in which one or more of the cards are clamped to each other, so that deviation and variation may be separately set and the final true course be found by a resultant of the combined movements.

Having thus described my invention what I claim and desire to secure by Letters Patent is:

1. An automatic course and deviation finder comprising the following instrumentalities: a base, a plurality of graduated compass cards concentrically pivoted on said base, means for independently setting and independently locking said cards on the base, and a direction finder or indicator overlying all the cards and radially extensible in any direction from the center thereof.

2. An automatic course and deviation finder comprising the following instrumentalities: a base, a plurality of graduated compass cards concentrically pivoted on said base, all cards below the top card being provided with openings, means extending and attached to each overlying card through said openings in the cards beneath it, for independently setting and independently locking said cards on the base, and a direction finder or indicator overlying all the cards and radially extensible in any direction from the center thereof.

3. An automatic course and deviation finder comprising the following instrumentalities: a base, a plurality of graduated compass cards with all graduations exposed concentrically pivoted on said base, all cards below the top card being provided with openings, a lever attached to each card beneath the same and extending down through said openings in the cards beneath it and out radially through a slot in the base, with means to clamp said levers in any position to which they and the cards are set.

4. An automatic course and deviation finder comprising the following instrumentalities: a base, a plurality of graduated compass cards with all graduations exposed concentrically pivoted on said base, all cards below the top card being provided with openings, a lever attached to each card beneath the same and extending down through said openings in the cards beneath it and out radially through a slot in the base with a cone or wedge mounted at the end of each lever and adapted to be forced into the slot when the lever is set, to hold it and its card in fixed position.

5. A course finder comprising means for taking angular readings, and a centering device separately applicable to a chart, with interlocking means for automatically guiding the course finder into centered and oriented position.

6. A course finder comprising means for taking angular readings comprising a base with a downwardly projecting central point, and a separate guide strip separately applicable to a parallel or meridian on a chart, with guiding means on said base and a projection on said strip, whereby the base may be slid along said strip until its pivot point engages said projection, thereby both centering and orienting the base and the parts carried thereby.

7. A course finder comprising compass cards and a base, an extensible direction indicator such as a cord concentrically secured above said cards so as to be extensible thereover, a strip having centering means and separately applicable to meridians and parallels on a chart, radial slots in the rim of said base to engage said strip for purposes of orientation, and a center point in the lower face of the base to engage the centering means in the strip for purposes of centering.

8. A course finder and direction indicator comprising a base, compass cards revolubly mounted on said base, and a guide strip carrying centering means and separately applicable to a chart, said base having a downwardly projecting rim with slots at four points in quadrature with each other, respectively beneath the 90, 180, 270 and 360 degree points, each slot accurately proportioned to receive and slide along on said strip, and a center pivot extending beneath the base in position to engage the centering means on the strip, whereby the device can be quickly and accurately oriented and centered on a chart at the intersection of any line representing a vessel's course with any desired meridian or parallel, by first placing the strip in position and then sliding the base along the strip until its pivot point engages the centering means.

9. An instrument of the class described comprising a base having an opening, and a rim thereon with a radial slot, a compass card on said base, a lever on said compass card extending down through said opening in the base and out through said radial slot in the rim thereof, with locking means adapted to engage the slot and lever to lock the lever and the card when set.

In testimony whereof I affix my signature.

RICHARD M. CHRISTENSEN.